No. 620,564. Patented Mar. 7, 1899.
J. S. BUBB.
COMBINED AIR OPERATED CAR COUPLING AND TRAIN PIPE COUPLING MECHANISM.
(Application filed Apr. 18, 1898.)
(No Model.) 4 Sheets—Sheet 2.
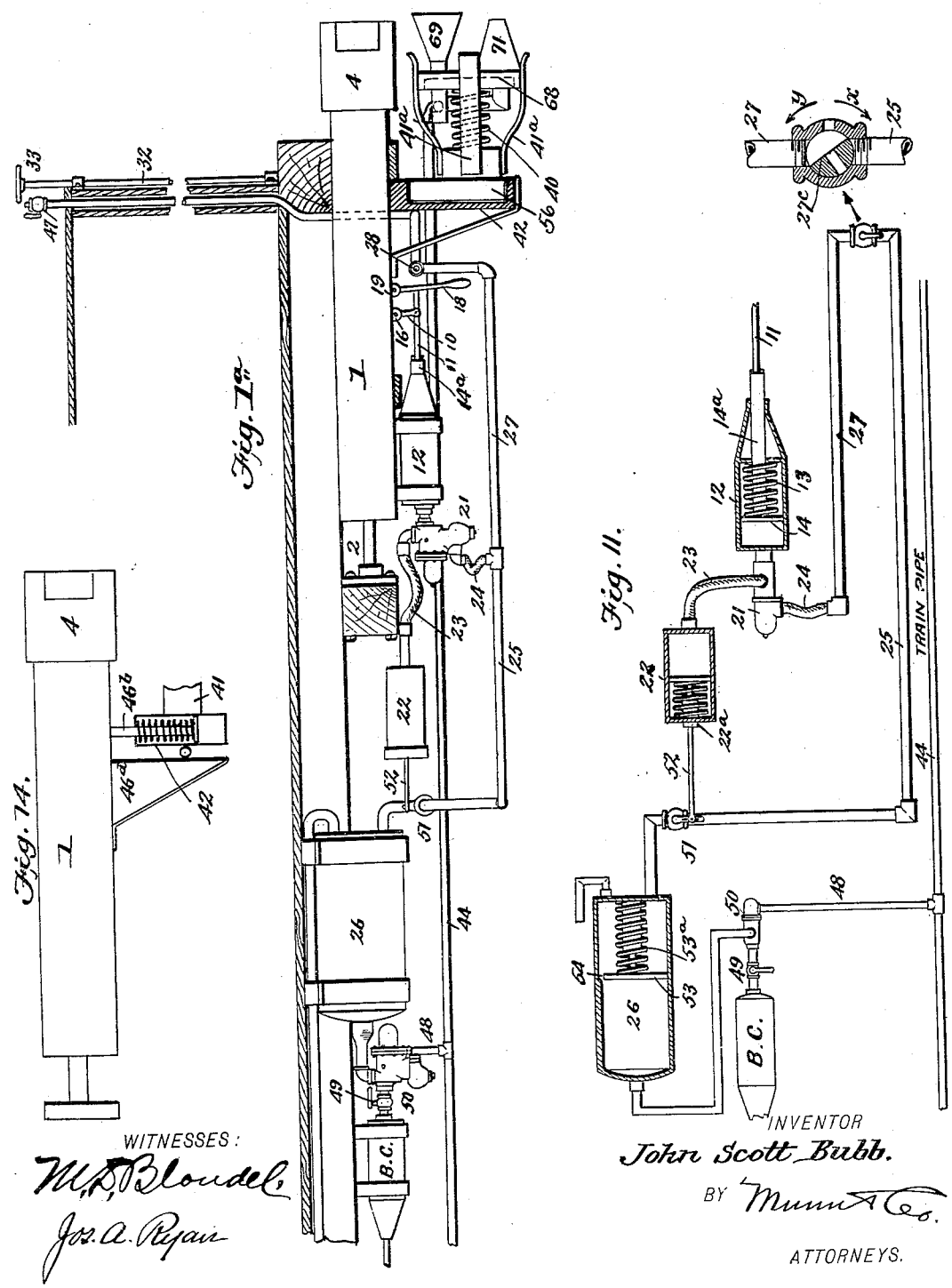
WITNESSES:
INVENTOR
John Scott Bubb.
BY Munn & Co.
ATTORNEYS.

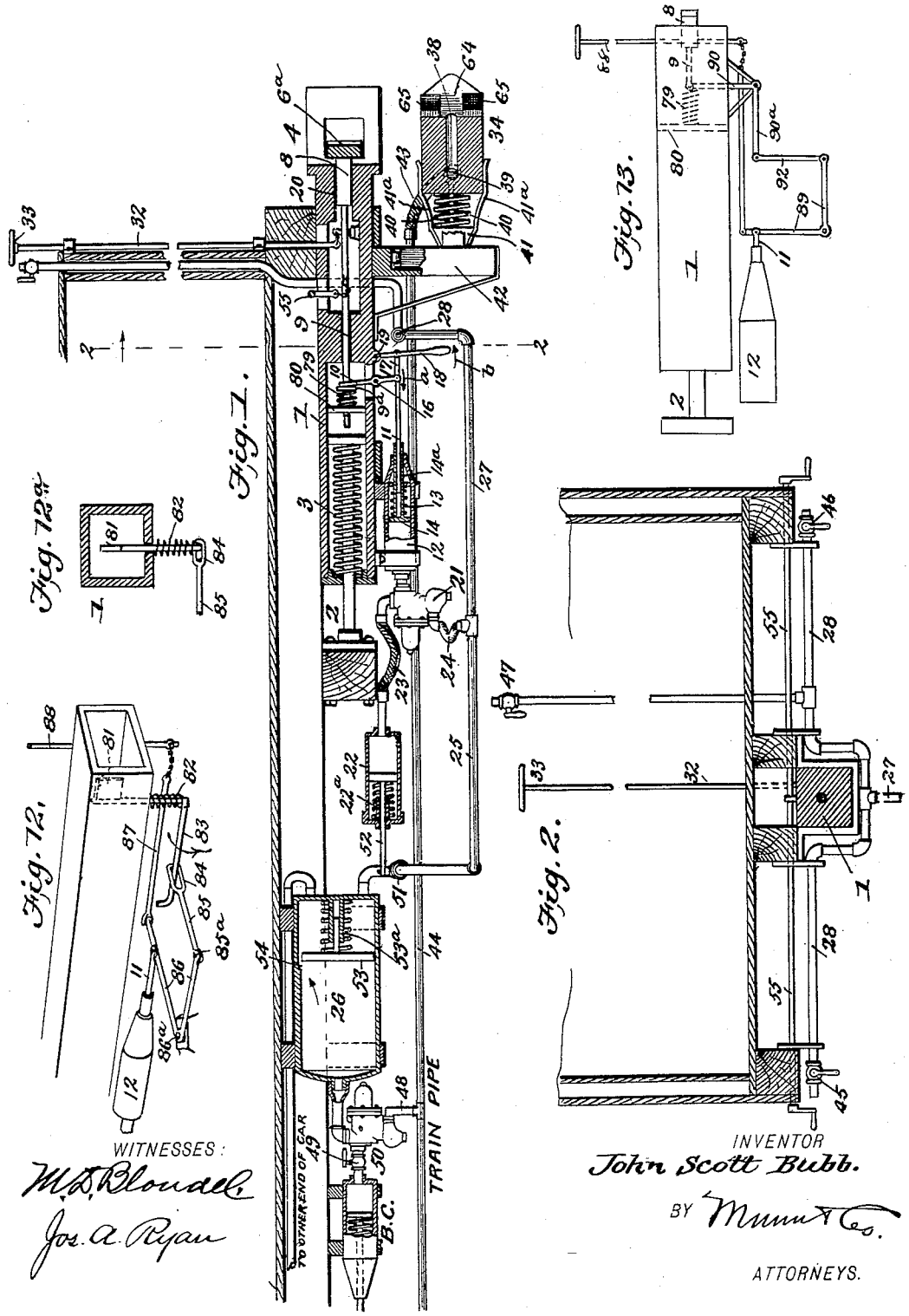

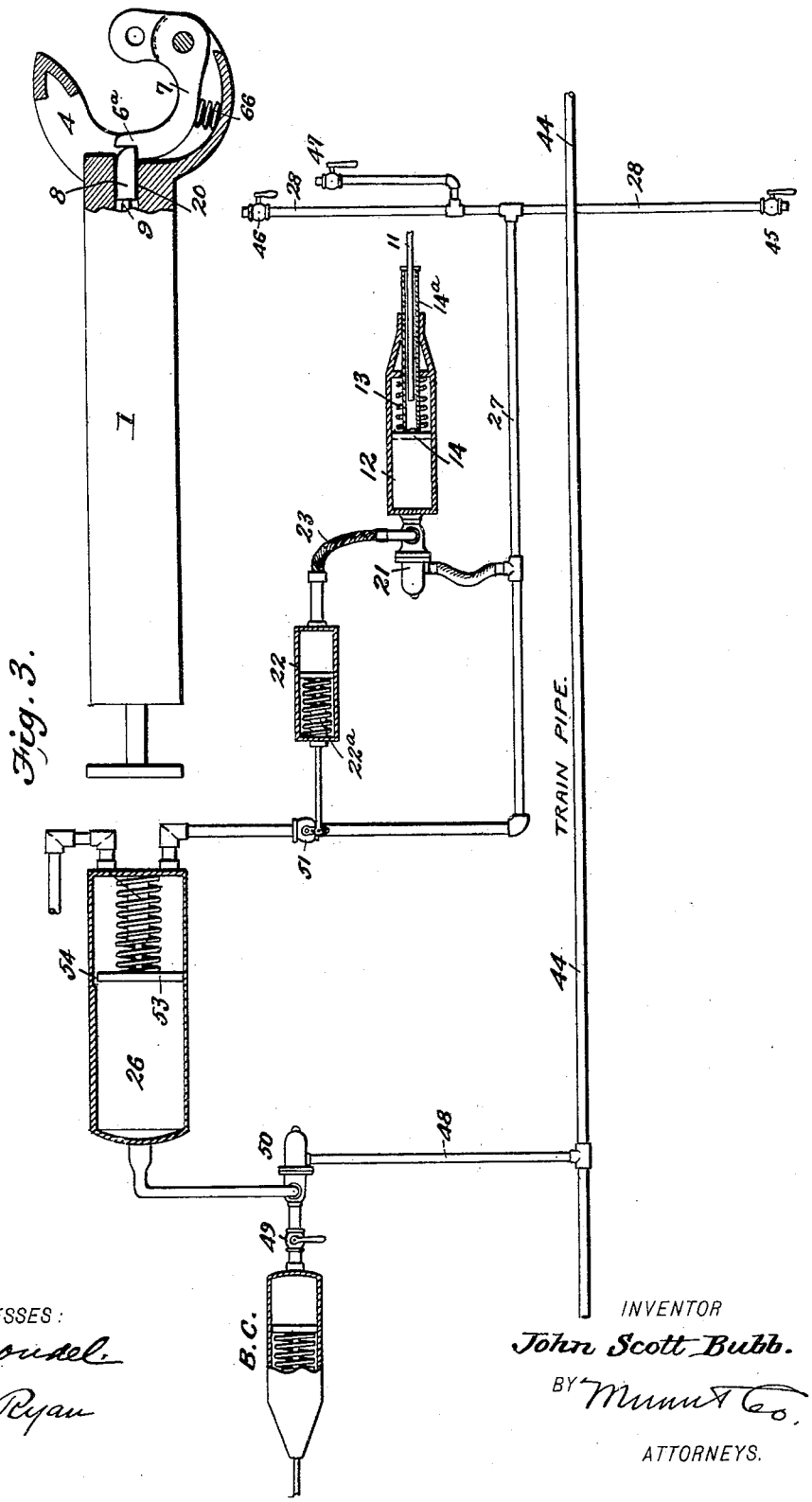

No. 620,564. Patented Mar. 7, 1899.
J. S. BUBB.
COMBINED AIR OPERATED CAR COUPLING AND TRAIN PIPE COUPLING MECHANISM.
(Application filed Apr. 18, 1898.)
(No Model.) 4 Sheets—Sheet 4.
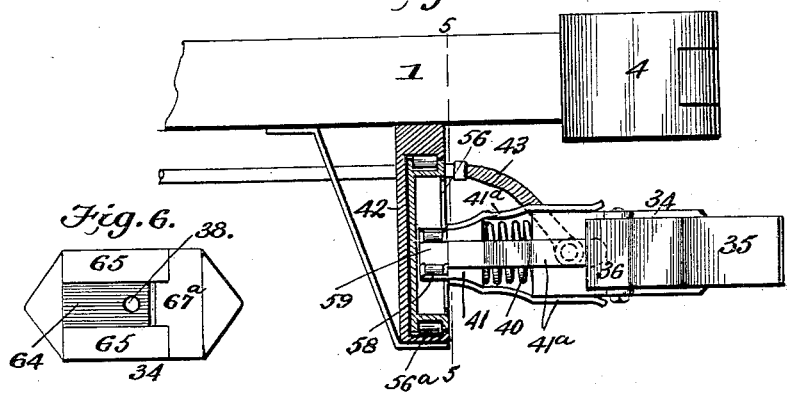
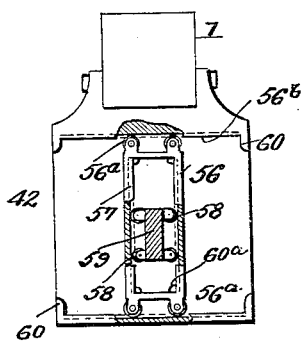
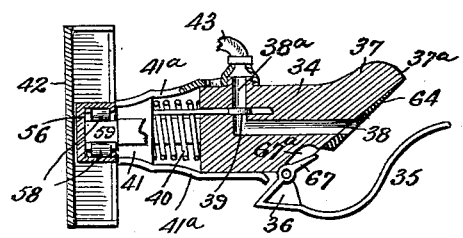
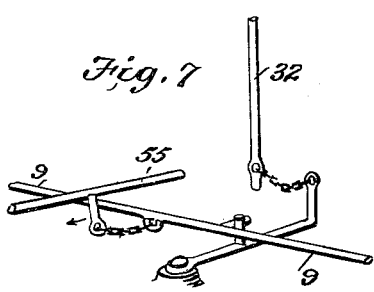
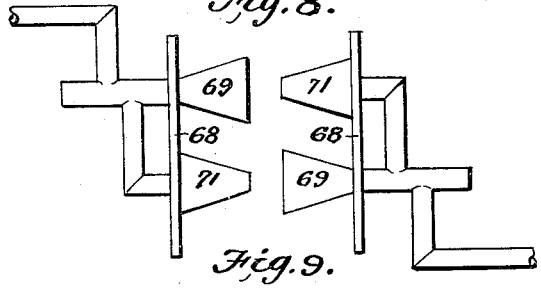
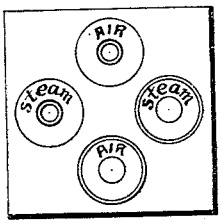
WITNESSES:
M. D. Bloudel.
Jos. A. Ryan.
INVENTOR
John Scott Bubb.
BY Munn & Co.
ATTORNEYS.

UNITED STATES PATENT OFFICE.

JOHN SCOTT BUBB, OF KITTANNING, PENNSYLVANIA.

COMBINED AIR-OPERATED CAR-COUPLING AND TRAIN-PIPE-COUPLING MECHANISM.

SPECIFICATION forming part of Letters Patent No. 620,564, dated March 7, 1899.

Application filed April 18, 1898. Serial No. 678,094. (No model.)

*To all whom it may concern:*

Be it known that I, JOHN SCOTT BUBB, residing at Kittanning, in the county of Armstrong and State of Pennsylvania, have invented a new and Improved Combined Air-Operated Car-Coupling and Train-Pipe-Coupling Mechanism, of which the following is a specification.

My invention is in the nature of a quick-action pneumatic mechanism for automatically setting the coupling-pin to its coupling position and adapted to be set in operation to move the pin to its uncoupling position by hand-manipulated release devices operated either from the sides, top, or other portion of the car.

The invention also embodies a novel arrangement of coupling means for joining the train air-pipes, which coact with and form a part of the air-operated coupling-pin-adjusting mechanism.

The invention also comprehends the construction of the air-operated means for setting the coupling-pin to its uncoupling position, hose-coupling devices coacting therewith, and an air-brake mechanism combined with such devices, forming an interdependent part of the complete structure of my improvement, but capable of being operated independent of the air-operated coupling-pin and hose air coupling devices.

Another object of this invention is to provide mechanical means whereby when the brake appliances of any car become deranged or inoperative such devices can be cut out from the draw-head or car and coupling-pin mechanism without affecting such mechanism.

In its subordinate features the invention consists in certain details of construction and novel combination of parts, which will hereinafter be first described, and then specifically pointed out in the appended claims, reference being had to the accompanying drawings, in which—

Figure 1 is a longitudinal section of my improvements, parts being broken away, the air coupling-pin being shown in its coupling position. Fig. 1ª is a view of a modified arrangement hereinafter referred to. Fig. 2 is a section on the line 2 2 of Fig. 1. Fig. 3 is a diagrammatic plan view, partly in section, of one draw-head and the car air coupling-pin-operating mechanism. Fig. 4 is an enlarged section of one of the hose air coupling members and illustrating its connection with the draw-bar, parts of which and the draw-head are shown in side elevation. Fig. 4ª is a horizontal section of the air-pipe-coupling devices shown in Fig. 4. Fig. 5 is a detail section on the line 5 5 of Fig. 4. Fig. 6 is a face view of one of the air coupling-heads. Fig. 7 is a detail view of one form of hand operating devices for moving the air coupling-pin. Figs. 8, 9, and 10 are detail views of modified forms of the hose air coupling hereinafter described. Fig. 11 is a view of a modified arrangement of connecting the supply-pipe 25 and its coacting parts with the main reservoir. Figs. 12, 12ª, 13, and 14 are views of further modifications, hereinafter referred to.

In the practical application of my invention the draw-bar 1 is held for a limited longitudinal slide movement in suitable guides on the car-frame, it having the usual buffer-spring devices 2 3 at the rear end.

The draw-head 4 is preferably of the Janney or knuckle type, it having in its rear wall an aperture 20 for the passage of the coupling-pin head 8, the outer face of which is beveled to facilitate the uncoupling action of the lock end 6ª of the pivoted knuckle 7, which is normally forced to its uncoupled position by the spring 66, as clearly shown in Fig. 3. The air-operated coupling-pin is horizontally movable on the draw-bar and has a rearwardly-extending shank 9, guided in the cross-brace 80, but held normally pressed forward to the locking position by the spring 79, interposed between the brace 80 and the collar 9ª on the shank 9.

10 indicates a lever pivotally joined at the upper end to the shank 9, extended down and fulcrumed on the lug 16, cast on the draw-bar and having its lower end pivotally connected to a rod 11, which extends into the hollow piston-rod 14ª of the piston 14, operating in the cylinder 12, which is adapted to be charged with air to force the piston 14 outward to effect an uncoupling operation of the lever 10, which in such operation moves the coupling-pin shank 9 rearward to disengage its head from the pivoted coupling member, it being understood that when the piston 14 is thus moved by air-pressure it has a fixed engagement with the rod 11. The purpose of making the rod 11 movable in a hollow piston-rod is to admit of such rod 11 being freely moved forward without affecting the piston 14 when the coupling-pin is uncoupled by hand, as will presently be more fully explained, the lever 79 being swung normally in the direction indicated by the arrow A by reason of the tension of the spring 13.

The cylinder 12 is mounted in suitable hangers held pendent from the draw-bar 1, and its rear end is connected with the discharge of the triple-valve mechanism 21 of the Westinghouse type, which controls the air to and from such air-cylinder 12, and which, through the flexible connection 24, is held in communication with the air-operated coupling-pin controlling distributing air-pipe 27 and the feed-pipe 25 communicating with the main reservoir 26, such valve mechanism 21 being also joined by the flexible tube 23 with a supplemental air-cylinder 22, which is fed through the triple valve 21, and has for its purpose to operate a cut-off valve 51 in the feed-pipe 25, the function of which will appear hereinafter.

The distributing-pipe 27 connects with the lateral 28, extending transversely on the car and provided with one or more car air coupling-pin-releasing blow-off valves 45, 46, and 47 for reducing pressure in the pipe 27 to uncouple the car, and such transverse pipe 28 may have a lateral extended to the top of the car, whereby the air-controlling devices may be attached to the car top, if desired.

When using my improvements on freight-cars, a transversely-disposed hand-operated rock-lever 55 is also preferably provided, connected with the air-operated coupling-pin shank 9 for moving the same to an uncoupling position by hand from the sides of the car, it being also obvious that a hand-operated rotary shaft 32, having a hand-wheel 33 at the top of the car, may also be connected to the shank-pin for uncoupling by hand from the top of the car.

18 indicates a hand-lever pivoted to the lug 19, held pendent from the draw-bar 1, to which the extension 17 on the piston-rod 11 is joined. By moving the lever 18 in the direction indicated by arrow B the coupling-pin can be thereby operated by hand.

So far as described it will be readily seen that the coupling-pin, air-cylinder 12, and the triple-valve mechanism 21 are movable with the draw-bar, so as to maintain a proper relation at all times irrespective of the longitudinal movement of the draw-bar, such movement being also rendered possible by the flexible connections 23 24, which join such valve mechanisms with the supplemental air-cylinder 22 and the distributing-pipe 25 27, which air-cylinder 22, as also the reservoir 26, the brake-cylinder, and the distributing-pipes 27, 25, 48, and 44, is fixedly secured to the car-frame.

In operation, assuming the parts to be in coupled position shown in Fig. 1, to uncouple the draw-head it is only necessary to reduce the air-pressure in the pipe 27 28 sufficient to cause a shifting action of the valve mechanism 21 to open up communication between air-cylinders 12 and 22, (the air passing from air-cylinder 22 through valve mechanism 21 into the cylinder 12,) which forces the piston 14 forward, and in consequence, through the lever 10, pulls the car air-operated coupling-pin 8 back from engagement with the pivoted coupling-jaw 6$^a$. The cut-off valve 51 in feed-pipe 25 is closed only when the air-pressure in cylinder 22 is sufficient to close it, when such valve 51 cuts off the main reservoir 26 from the feed-pipe 25 27, and thereby holds the air in pipes 23 24 25 28 48 44 and the cylinder 22 until the pressure in such cylinder 22 is reduced in any manner, when the said valve 51 opens and lets more air out of cylinder 26, such valve 51 being held open until the air passing through pipe 25 and the triple valve 21 through pipe 23 into cylinder 22 restores the pressure in such cylinder 22 to its normal, which pressure again closes the valve 51, and in consequence allows the triple-valve mechanism 50 and the reservoir 26 to remain in such position as to admit of a manipulation of the brake-operating devices in the usual manner without in the least interfering with the coupling-pin-operating mechanism hereinbefore described. The stem of valve 51 has its piston 52 operating in cylinder 22, it passing through an air-tight cuff member 22$^a$.

53 indicates a piston in the air-reservoir 26, (or it can be at the end of such air-reservoir in a separate chamber communicating therewith.) This piston when in an open position, as shown in the drawings, allows the air to pass from air-reservoir 26 to the air-line 25 when the pressure of air in the cylinder 22 has been reduced sufficient to open valve 51. The rod of piston 53 works in the cuff member 53$^a$ and is held pressed toward the escape-opening 54 of the air-reservoir. When there is full pressure of air in the air-reservoir 26, the piston 53 is pressed back so as to uncover an escape-port 54 to allow for the passage of air from the air-reservoir 26 to the pipe 25 and into air-cylinder 22, and as the pressure in such air-cylinder 22 reaches its maximum it forces the valve 51 to its closed position, and when the pressure is thus equalized in air-reservoir 26 the spring 53$^a$, together with the air behind the piston 53, will force the piston 53 beyond the opening 54 and hold air in the front end of the air-cylinder 26 to its high pressure for a free operation of the brake devices when necessary, and will remain in full pressure until air-valve 51 has been opened by a reduction of air in air-reservoir 22. As it is often necessary to uncouple the cars and use the brake at the same time, the piston 53 will control this as long as there is any air left in the main reservoir and air-piston 53 will always close the port 54 at each application of the air-brake and will only open by the pressure of air being forced into it from the main train-pipe 44 through the triple valve 50. As soon as pressure in the cylinder 22 is reduced sufficient to shift valve 51 to its open position a free charge of air is fed from the reservoir 26 through pipe 25 back into the said cylinder 22. Thus it will be seen that after the cars have been uncoupled by reason of the opening of any one of the valves 45, 46, and 47 to reduce pressure in pipe 27 there can be no waste of air from the reservoir 26, as the valve 51 will be closed as soon as the cylinder 22 has been recharged from the said reservoir 26 to a pressure sufficient to shift the valve 51 back to its closed position.

34 indicates one form of the air-coupling heads which connect the train-pipe sections. The front face of this head 34 extends to the line of draft at an acute angle from its base, and projecting over such face it has a spring 35, which serves to hold the head of the opposing coupling-section closed against it, the purpose of which will hereinafter appear. At the right side edge of head 34 is a funnel lock-socket 36, which receives the point of the opposing coupling-head and which, as will be seen in Fig. 4, has its face inclined reversely to the other head, so as to snugly fit thereagainst when the heads are brought together, the points 37 of the heads fitting the socket 36.

To positively hold the points 37 in a tight frictional contact with the pockets 36 and the faces more securely against each other, the points 37 have elastic or rigid lugs 37$^a$, which form detents or retarding members to prevent the heads easily pulling away from the springs 35, and to still further provide for holding the springs 35 in a tight frictional contact with the heads they preferably have a hinged connection with their respective heads and are formed with an angle-tongue 67, which when the opposing heads come together is forced back into a socket 67$^a$, and thereby swing the springs 35 inward tightly against the opposing head. By providing funnel lock-pockets 36 it is manifest that the two heads will be properly guided in place as they unite and their air-openings 38 brought in a proper register. To make the joints of the heads 34 air-tight, their front faces have rubber bearing portions 64 and flat springs 65 on each side thereof.

In practice the coupling-heads are about ten inches high and six inches wide and can be made to carry more than one air or steam line by placing one set of openings above the other. As the air-distributing means employed is common to both the car air coupling-pin-operating mechanism and the hose air couplings, it is essential that the hose air coupling and car air coupling devices maintain a fixed relation irrespective of the longitudinal movement of the draw-bar. For this purpose the hose air coupling devices are connected with the draw-bar in such a manner as to move longitudinally in unison therewith, whereby to keep the two sections in a firmly-locked engagement, but capable of having a limited lateral and vertical movement to compensate for any irregular running in such directions. This is accomplished by having the shank 41 of the head 34 connected with the support and guide member 42, fixedly connected to and held pendent from the draw-bar. On the member 42 is secured a carriage 56, which has suitable guide-rollers 56$^a$ engaging guides 56$^b$, horizontally arranged over the face of the member 42, whereby the carriage is capable of moving laterally in either direction, such movement being limited by stop 60. The carriage also has vertical guides 57 for the rollers 58, secured to the slide-block 59, made fast to the shank 41, and which has vertical movement on the guides 57, limited by the stop 60$^a$. By thus connecting the heads 34 to the member 42 it is manifest that such head will automatically adjust itself either vertically or laterally and at the same time in both directions as it engages its opposing head as the cars come together, and thereby automatically make a proper air-tight connection.

39 indicates a valve in the air-port 38$^a$ of the head 34, which automatically opens and closes as the cars are coupled and uncoupled. It is attached to the rod which runs back to the shank 41, which shank, it should be stated, has forwardly-extended spring-arms 41$^a$, which project over the four sides of the rear end of the head 34. The head 34 is positively connected with the shank 41 by a spring 40, one end of which is connected to the shank, while the other joins with the rear end of the head 34. This spring 40 also serves to normally force the head out from the shank 41 to bring the valve 39 to a closing position, it being understood that when the heads 34 are uncoupled the expansion of the spring 40 will quickly adjust the springs 39 to automatically close off the train-pipe, it being also manifest that the valve 39 will be moved to its open position as soon as the heads 34 are coupled.

In practice the train-pipe couplings are so disposed relatively to the coupling that they will couple in advance of the draw-heads, so that as the train-pipe will be in line with the reservoir 26 before the car couples, thereby making the connecting of the air-line a certainty and removing the danger of its not coupling when the cars come together.

43 indicates a rubber-hose section in the train-pipe to allow for a free movement of the pipe-couplings.

44 indicates a main air train pipe, and 48 a branch line which feeds the main reservoir 26 and in which is located a triple-valve mechanism 50, (preferably of the Westinghouse type,) which also feeds to the brake-cylinder B C.

49 indicates a cut-off valve in the pipe connecting the brake-cylinder with the valve mechanism 50. By placing the valve 49 between the valve 50 and brake-cylinder the brake-cylinder can be cut out in case the brake mechanism should become deranged without cutting out the main reservoir 26 from the air-pipe 48, and thereby provide for a free distribution of air for operating the coupling and uncoupling of the cars.

The valve 51, which is automatically operated by the varying pressure in the cylinder 22, is held open so long as the pressure in the cylinder 22 is reduced sufficient to allow the spring devices for the stem 52 to hold it to such position; but it is closed as soon as the pressure with such cylinders 22 overcomes such spring devices and forces the stem 52 outward. As soon as pressure in the cylinder 22 is sufficiently reduced the valve 51 will open and allow air from the reservoir 26 to again pass through line 25 and the triple valve 21 back into cylinder 22 and cutting off air from the reservoir 26, as before stated. Now as no air under the conditions stated flows from reservoir 26 to the cylinder 22 it follows that when the air in the feed-pipes 27 28 is reduced the air in cylinder 22 will, owing to the shifting of the triple-valve mechanism 21 by reason of the reduction of pressure in pipes 27 28, flow into the cylinder 12, and as the pressure in the said cylinder 22 is thus reduced the valve 51 will again shift to its open position and again place cylinder 22 in communication with reservoir 26. Another and important advantage in having valve 51 operated as described is that the same will maintain a full supply of air-pressure in cylinder 22 and train-pipe 25 27 when the main-reservoir pressure is reduced by the application of the brakes, it being obvious that were the line from pipe 25 to main reservoir not closed during such operation the cars would be coupled at each application of the brakes.

From the foregoing, taken in connection with the accompanying drawings, it is thought the complete operation and advantages of my invention will be readily understood.

It will be observed that my improved air operating devices are so arranged as to allow for the operation of the brakes at all times in the usual manner without in the least affecting the coupling or uncoupling of the cars.

Numerous changes in form, in detail, and arrangement of the several parts constituting my invention may be made without departing from the principle thereof or the scope of the appended claims, as the structure illustrated in the drawings has been employed to set out the general character of my invention only. For example, instead of forming the train-pipe air-couplings as above described the same may be constructed as illustrated in Figs. 1ª, 8, 9, and 10, by reference to which it will be seen that the two heads form funnel-like couplings. In this construction each head preferably consists of two sections—a male section 71 and a female section 69—mounted on base members 68. The apex of the funnel-section 69 have a rubber seat at the air-point to cause the apex of the opposing sections to make a close joint as the two sections come together, and such seats are held down in an air-tight position by suitable springs 74, and to keep the air-port open the said seats have metal tubes fitted in their air-passages. The funnel-sections 69 are also preferably provided with a push-rod 70, which extends back from the air-feed pipe, and such rod has a hollow head or button which fits the discharge-opening 71ª of the section 71. The inner end of the rod 70 carries a slide-valve 72, operating over the port 73 in the air-line, which will be, owing to the back pressure on the section 71 on the rod 70, shifted to uncover the said port 73 when the two sections come together and be returned to its closing position by the spring 74 when the cars are uncoupled. The heads 71 and 69 in the practical construction will have their base portions connected to the draw-bar 1 and be provided with flexible hose-sections joining them with the train-pipe.

In Fig. 11 is shown a somewhat-modified form of connections for joining the cylinder 22 and the reservoir 26 and for effecting an uncoupling action. In this the pipe 27 forms practically a continuation of the feed-pipe 25, as it completes the connection between the aforesaid reservoir 26 and the cylinder 22. At a suitable point the air-pipe 25 27 has a three-way valve 27ᶜ, which in practice may be operated by suitable lever connections from any part of the car. The purpose of this valve is to provide for an uncoupling action without in the slightest affecting the pressure of air held within the cylinder 26. It will be readily understood by reference to the aforesaid Fig. 11 that by turning the valve 27ᶜ in the direction indicated by x the action thereof will at once cut off the reservoir 26 from the cylinder 22 and also open up the pipe 27 to atmosphere, thereby reducing the pressure of air in the said pipe-section 27 sufficient to shift the valve 21 and admit of a quick action of the uncoupling-cylinder 12 by reason of the air charged therein from the cylinder 22.

In Figs. 12 and 13 are shown further modifications of my invention, the form shown in Fig. 12 being especially adapted for passenger-cars, while that shown in Fig. 13 is intended for freight-cars.

Referring now to Fig. 12, 81 indicates the coupling member or pin, which in this case has a rocker action and is normally held to its coupling position by the spring 82. The lower end of the shaft of the member 81 has a rearwardly-extending arm 83, which passes through and is longitudinally movable in the loop 84, forming a part of the operating-rod 85, which is pivotally connected to one end of a bell-crank lever 86, fulcrumed at 86ª on the car-frame and having a pivotal connection with the end of the rod 11 of the piston operating in the cylinder 12. By arranging the parts as described it is obvious that as the piston is forced out by the action of the air in the cylinder 12 the arm 83 will be drawn out in the direction indicated by the arrow and in consequence move the member 81 to an uncoupling position, the spring 82 returning the member 81 to its coupling position as soon as the air-pressure in the cylinder 12 is released. One end of the lever 86 is extended and connected to a rod or chain 87, in turn connected with the hand-operated lever 88, extended to any convenient point on the car, the manipulation of which will effect an uncoupling action.

The structure shown in Fig. 13 is substantially the same as that shown in Fig. 12. In this form a slide coupling-pin 8 is used the same as in Fig. 1, with which connects a pivoted angle-lever 90, the arm 90$^a$ of which joins with the angle-lever 89 by the pivoted link 92, the lever 89 in this case being also connected to a hand-operated lever 88. By providing the link connection 92 the lever 90 will move freely with the draw-bar without affecting the piston in the cylinder 12.

Instead of making the support 42 for the pipe-coupling devices as shown in Fig. 1 such support may be arranged as shown in Fig. 14, in which it is shown as having a suitable spring 46$^a$, mounted on a pendent hanger 46$^b$, the purpose of which is to produce a quick action up or down of the said member 42 when the coupling-heads come together. To facilitate such operation, the part 42 has a roller-bearing 46$^c$, which also engages the pendent back bearing 46$^d$.

It will be readily understood that the air coupling devices shown in Figs. 8 and 9 for the train-pipe may be placed at any position relatively to the draw-head as conditions may make desirable and that the details of construction of the several parts constituting my invention may be modified without departing from the scope of the appended claims, it being also manifest that the coupling devices may be used as a means for making electrical connections throughout the train and for connecting the gas and water distributing systems.

Having thus described my invention, what I claim, and desire to secure by Letters Patent, is—

1. An improved car-coupling means embodying the following elements: a draw-head having a coupling-pin, and mechanism for normally forcing it to its coupling position; an air-controlled means for shifting the pin mechanism to an uncoupling position, held in line with the air-brake train-pipe, but operative independent of the pressure in such train-pipe, and having a reducing-valve, substantially as described.

2. In an improved car-coupling mechanism; in combination; a draw-head having a coupling-pin, normally held to its coupling position; an air-controlled mechanism for moving it to its uncoupling position, charged from the air-brake train-pipe, and having a reducing-valve; the train-pipe; and automatic couplings for the train-pipe, as set forth.

3. In an improved car-coupling mechanism; in combination; a draw-head having a coupling-pin normally held to its coupling position; an air-controlled mechanism for moving it to its uncoupling position, charged from the air-brake train-pipe, and having a reducing-valve; a train-pipe; and automatic couplings for the train-pipe, said couplings being arranged to couple in advance of the draw-heads, as specified.

4. In an improved car-coupling mechanism; in combination; a draw-head having a coupling-pin normally held to its coupling position; an air-controlled mechanism for moving it to its uncoupling position, charged from the air-brake train-pipe, and having a reducing-valve; a train-pipe; and automatic couplings for the train-pipe, said couplings being connected to and movable with the draw-bar, as specified.

5. In an improved car-coupling mechanism; in combination; a draw-head having a coupling-pin normally held to its coupling position; air-controlled mechanism for moving it to its uncoupling position, charged from the air-brake train-pipe, and having reducing-valves; a train-pipe; and automatic couplings in the train-pipe, said couplings being movable longitudinally with the draw-bar and having independent vertical and lateral motion, as set forth.

6. In an improved car-coupling mechanism; in combination; a draw-head having a coupling-pin normally held to its coupling position; and air-controlled mechanism for moving it to its uncoupling position; charged from the air-brake train-pipe, and having reducing-valves; a train-pipe; and automatic couplings for the train-pipe, having a valve automatically closing as the heads separate and opening as they couple, as set forth.

7. In an automatic car-coupling mechanism, the combination with the draw bar and head, and a coupling-pin normally held to its coupling position; an air-brake mechanism including the main reservoir, the brake-cylinder, the triple valve 50, and the train-pipe 44; of the supplemental air-controlled mechanism, including the cylinder 12, having an operating-piston for moving the coupling-pin devices to an uncoupling position, an air-holding cylinder 22; a triple-valve mechanism 21, common to the air-holding and piston cylinders, the distributing-pipe connecting the pipe 44 and the main reservoir; a cut-off valve operated by the reduction of air-pressure in the cylinder 22, to close off the pipe 25, from the main reservoir and reducing-valves in such pipe 25, all being arranged substantially as shown and described.

8. In an automatic car-coupling means; the combination with the draw bar and head, and the coupling-pin normally held to its coupling position; an air-brake mechanism; a supplemental air-controlled mechanism including a storing-cylinder 22, a piston-holding cylinder 12 having its piston connected with the coupling-pin-operating device; a triple valve 21 common to the cylinders 12 and 22; and a distributing-pipe 25 connecting the valve 51 with the main reservoir of the main brake mechanism; the cut-off valve 51, in the pipe 25, being operated by the varying pressure in the cylinder 22, said pipe 25 having reducing-valves, the cylinder 12, and a triple-valve mechanism 21, being connected by a coupling with the draw-bar as specified.

9. In a mechanism as described; the combination with the supplemental air-operating devices for setting the coupling-pin to its uncoupling position and means for setting and holding the pin to its coupling position; the train-pipe 25 having reducing-valves; of the reservoir 26 connected with the pipe 25, the brake-cylinder; a triple valve 50; the brake cut-off valve 49, the train-pipe 44, and a cut-off valve 51 in the pipe 25 all being arranged substantially as shown and for the purpose described.

10. The combination of the cylinder 12 longitudinally movable with the draw-bar, means for charging the cylinder from the main airline, the draw-bar-coupling member normally held to a coupled position, connections including the air-operated piston working in cylinder 12 for operating to move the coupling member to its uncoupling position and said connections including the bar 11 having longitudinal movement independent of the aforesaid piston, substantially as shown and described.

JOHN SCOTT BUBB.

Witnesses:
SOLON C. KEMON,
FRED G. DIETERICH.